US006978323B1

(12) United States Patent
Kimura et al.

(10) Patent No.: US 6,978,323 B1
(45) Date of Patent: Dec. 20, 2005

(54) INTERFACE CONTROL DEVICE AND COMPUTER SYSTEM FOR CONTROLLING DATA TRANSFER

(75) Inventors: Takemi Kimura, Inagi (JP); Satoshi Sue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/572,895

(22) Filed: May 18, 2000

(30) Foreign Application Priority Data

Aug. 26, 1999 (JP) .................................. 11-240375

(51) Int. Cl.[7] .............................................. G06F 3/00
(52) U.S. Cl. ............................ 710/20; 710/30; 710/32; 709/227
(58) Field of Search ............................. 710/20, 21, 30, 710/29, 32; 709/227

(56) References Cited

U.S. PATENT DOCUMENTS

| | | | |
|---|---|---|---|
| 5,524,218 A | | 6/1996 | Byers et al. |
| 5,777,987 A | * | 7/1998 | Adams et al. .............. 370/336 |
| 5,845,076 A | | 12/1998 | Arakawa |
| 6,029,233 A | | 2/2000 | Abily et al. |
| 6,049,878 A | * | 4/2000 | Caronni et al. ............. 713/201 |
| 6,385,671 B1 | * | 5/2002 | Hunsaker et al. ............. 710/28 |
| 6,389,477 B1 | * | 5/2002 | Simmon et al. ............ 709/234 |
| 6,470,382 B1 | * | 10/2002 | Wang et al. ................. 709/220 |
| 6,483,804 B1 | * | 11/2002 | Muller et al. ................ 370/230 |
| 6,633,565 B1 | * | 10/2003 | Bronstein et al. ........... 370/392 |

FOREIGN PATENT DOCUMENTS

| | | |
|---|---|---|
| DE | 197 22 803 A1 | 12/1997 |
| JP | 4-251360 A | 9/1992 |
| JP | 6-004422 A | 1/1994 |
| JP | 6-187277 | 7/1994 |

* cited by examiner

Primary Examiner—Fritz Fleming
Assistant Examiner—Eron Sorrell
(74) Attorney, Agent, or Firm—Staas & Halsey LLP (57) ABSTRACT

An interface control device controls the packet-type transfer of data between one or more computers and one or more input/output devices. According to one embodiment of the present invention, when the interface control device receives the lead packet in a series of packets from an input/output device, it creates new device control data to control the transfer of the series of packets, and also determines an identification number for the particular series of packet transfers. The interface control device then sends a notification packet, containing the identification number, to the sending input/output device in response to receiving the lead packet. When the interface control device receives a packet that is a second or subsequent packet in the series of packets, it determines whether the data stored in the packet are normal by referring to the device control data corresponding to the identification number stored in the subsequent packet. The transfer control unit continues the data transfer as long as the packets received are determined to be normal. If a packet is abnormal, the transfer control unit ends data transfer and notifies the sending input/output device. The present invention allows the transfer of packets from an input/output device to be interrupted so that data can be transferred from more than one input/output device in a certain amount of time, eliminating the need for input/output devices to wait in standby mode before being able to transfer data.

11 Claims, 6 Drawing Sheets

INTERFACE CONTROL DEVICE AND COMPUTER SYSTEM FOR CONTROLLING DATA TRANSFER

CROSS-REFERENCE TO RELATED APPLICATIONS

This application is based on, and claims priority to, Japanese application 11-240375, filed Aug. 26, 1999 in Japan, the contents of which are incorporated herein by reference.

BACKGROUND OF THE INVENTION

1. Field of the Invention

The present invention relates to a computer system with multiple input/output devices that is capable of realizing highly reliable and innovative data transfer between the input/output devices and the computer.

The present invention also relates to an interface control device that is used to control interfaces in this type of computer system. More specifically, the present invention relates to an interface control device that can be used with the main body of the computer.

2. Description of the Related Art

In computer systems having a variety of input/output devices, data are transferred between the input/output devices and a single interface control device located in the main body of the computer. The interface control device must determine which of the multiple input/output devices sends the data. Therefore, each of the input/output devices is given a unique identification number (hereinafter referred to as "device number"). The interface control device notifies each input/output device of the device number before data transfer starts. The interface control device is then able to determine, based on the assigned device numbers, which input/output device transfers data.

When the interface control device gives authorization to an input/output device to begin data transfer, a linked mode is established between the interface control device and the input/output device, and data transfer begins. The amount of data transferred from the input/output device is variable. Regardless of the amount of data transferred, the linked mode between the interface control device and the input/output device cannot be released until the input/output device completes delivery of all the data. Thus, data cannot be transferred between the interface control device and one input/output device when a linked mode has already been established with another input/output device. As a result, when several input/output devices request data transfer from an interface control device virtually simultaneously, only one of these input/output devices can actually carry out the data transfer. The remaining input/output devices enter into a standby mode until the current data transfer is completed.

Upgrading the data transfer capability of the interface control device may not necessarily solve this problem. For example, if the data transfer rate of the input/output device is low, the overall transfer rate would be adjusted to that of the input/output device. Thus, the transfer capability of the interface control device is not used to the fullest capacity.

To resolve this problem, packet-type data transfer was devised for data transfer between the interface control device and the input/output devices. In packet-type data transfer, each of the input/output devices partitions the data to be transferred into specific amounts and transfers the partitioned data to the interface control device as packets. The packets continue to be sent from the input/output device to the interface control device until all the data is transferred.

With this configuration, transfer of each packet to the interface control device is intermittent, time-wise, when the transfer rate of the interface control device is faster than the data preparation speed of the input/output device. In other words, the passage of a constant amount of time occurs from the time transfer of the initial packet is completed to the time transfer of the next packet begins.

Thus, when multiple input/output devices request data transfer simultaneously, it is possible to interrupt transfer of the packets being sent from a certain input/output device to the interface control device during apertures between transmission of the packets. This approach eliminates the need for the input/output devices to wait in standby mode for data transfer. As a result, during a certain amount of time, data can be transferred from more than one input/output device to the interface control device, maximizing the transfer capability of the interface control device.

Despite this improvement, internal processing can become cluttered in the interface control device. For example, the interface control device has to confirm the transmission address when each packet is received. When this type of configuration is used, the input/output device at the transmission address may be different for each packet the interface control device receives. As a result, the interface control device must confirm the appropriateness, as well as the source, of all packets received. This proves to be extremely burdensome for the interface control device.

This burden can be clearly understood by considering an example in which 42,760 bytes of data are sent two bytes at a time from each of three input/output devices. The respective data transfers are carried out continuously. As a result, the interface control device is able to confirm the address only when there is a transmission request from each of the input/output devices. In the final analysis, the interface control device is able to confirm a total of only six transmission sources.

In contrast, when the same amount of data is sent in packet form and each packet contains 4,096 bytes, eleven packets are sent for each data transfer series. Each time the interface control device accepts a packet, it must make a decision a total of 66 times concerning which input/output device sent the packet, which data transfer the packet is a part of, and whether the packet is valid.

Thus, the burden placed on the interface control device when it carries out packet-type transfer is considerably greater than a linked mode form of transfer. Therefore, if the decision-making for each packet received in the interface control device is not carried out efficiently, the transfer efficiency cannot be upgraded as desired due to overhead.

SUMMARY OF THE INVENTION

Accordingly, it is an object of the present invention to make the process of determining which packets are sent from multiple input/output devices more efficient. It is also an object of the present invention to provide a computer and a computer system with an interface control device that carries out high-speed data transfer.

Additional objects and advantages of the invention will be set forth in part in the description which follows, and, in part, will be obvious from the description, or may be learned by practice of the invention.

In the interface control device, according to one embodiment of the present invention, new device control data are created to control transfer of a series of data when the interface control device receives a packet that is the first or leading packet in a series of packets transferred from an input/output device. At this time, the interface control device selects an identification number for this series of packet transfers from the particular input/output device. The interface control device coordinates the beginning address of the newly generated device control data with the identification number n by determining n×256 (n×0×0100 in hexadecimal notation).

The identification number selected by the interface control device must be stored in the packets that are intermittently sent from the input/output device. As a result, the interface control device returns the identification number selected to the input/output device as a response to receiving the lead packet. The input/output device stores the number and sends it with all packets sent thereafter in the particular series of packets.

In another embodiment of the present invention, rather than the interface control device selecting the identification number, each input/output device stores an identification number and transfers the number with the packets sent to the interface control device. When the interface control device receives a lead packet in a series of packets, it creates new device control data to control the series of data transfers from the input/output device. Then, the interface control device coordinates the identification number stored in the lead packet with the newly generated device control data as described above.

Regardless of the particular configuration, the interface control device can distinguish between the input/output devices by referring to the identification numbers in the packets, even when multiple data transfers are sent from the same input/output device simultaneously. The identification number is stored in the second or succeeding packets in a series of packets, and the interface control device assigns the device control information corresponding to the identification number. The interface control device uses the constant law, n×256, described previously when assigning the device control data corresponding to the identification number. The interface control device also refers to the device control data to control the data transfer, which includes determining the validity of the packets.

Thus, the present invention allows the interface control device to receive data simultaneously from multiple input/output devices and reduces the overhead of the interface control device so that high-speed data transfer can take place.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
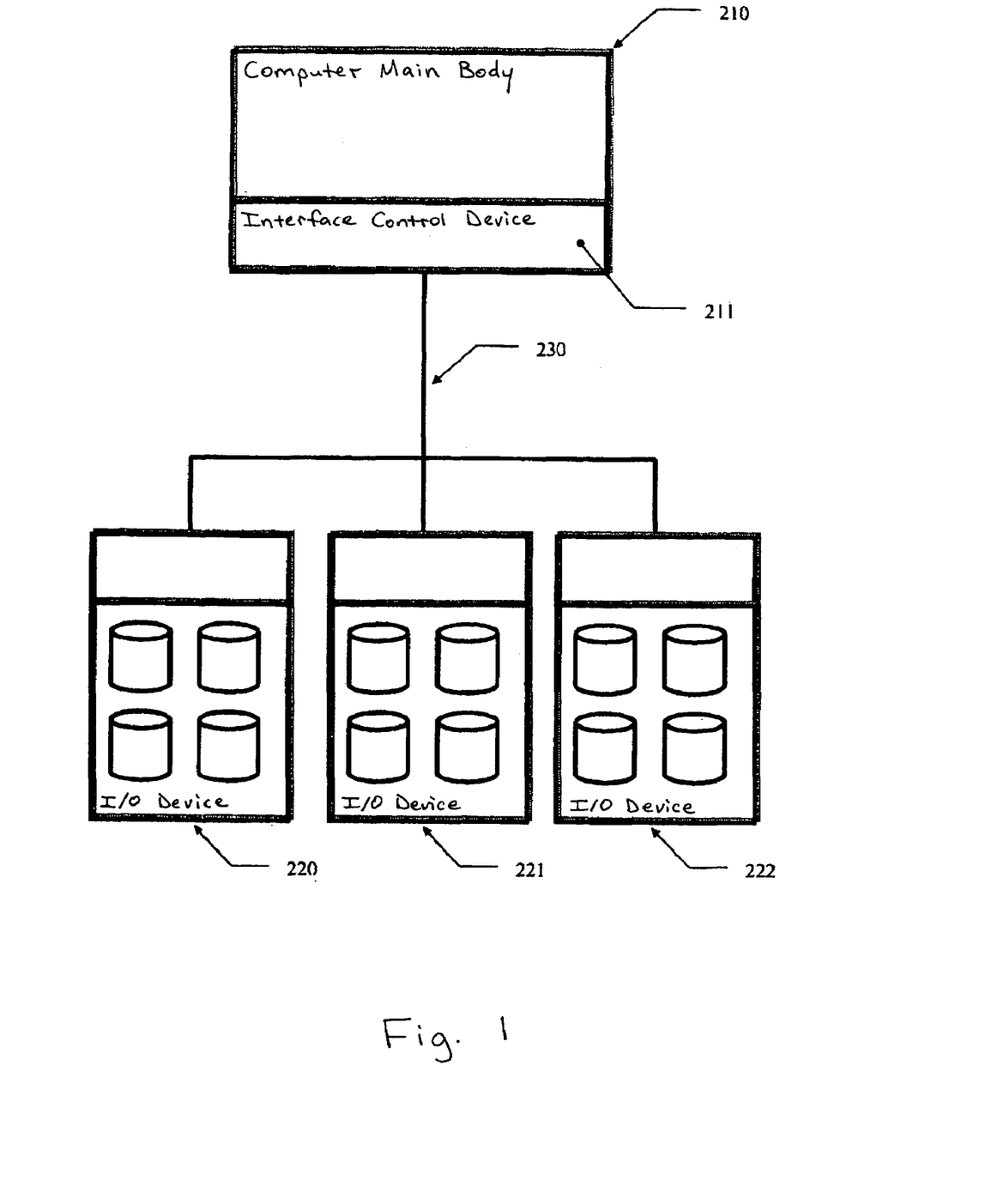
FIG. 1 is a diagram showing a computer system, according to an embodiment of the present invention.

FIG. 1 is a block diagram showing a computer system used in one embodiment of the present invention. In FIG. 1, a computer main body 210 is provided with an interface control device 211, which is used to control the data transfer process with multiple external input/output devices 220 through 222. The input/output devices 220 through 222 are disk servers equipped with multiple physical disks. Alternatively, each input/output device may contain a single disk.

The interface control device 211 and each of the input/output devices 220 through 222 are connected to an interface 230 on which packet-type data transfer can take place. The packet-type interface 230 may optionally be a serial interface, such as an optical interface, which makes use of a fiber channel.

Figure 2:
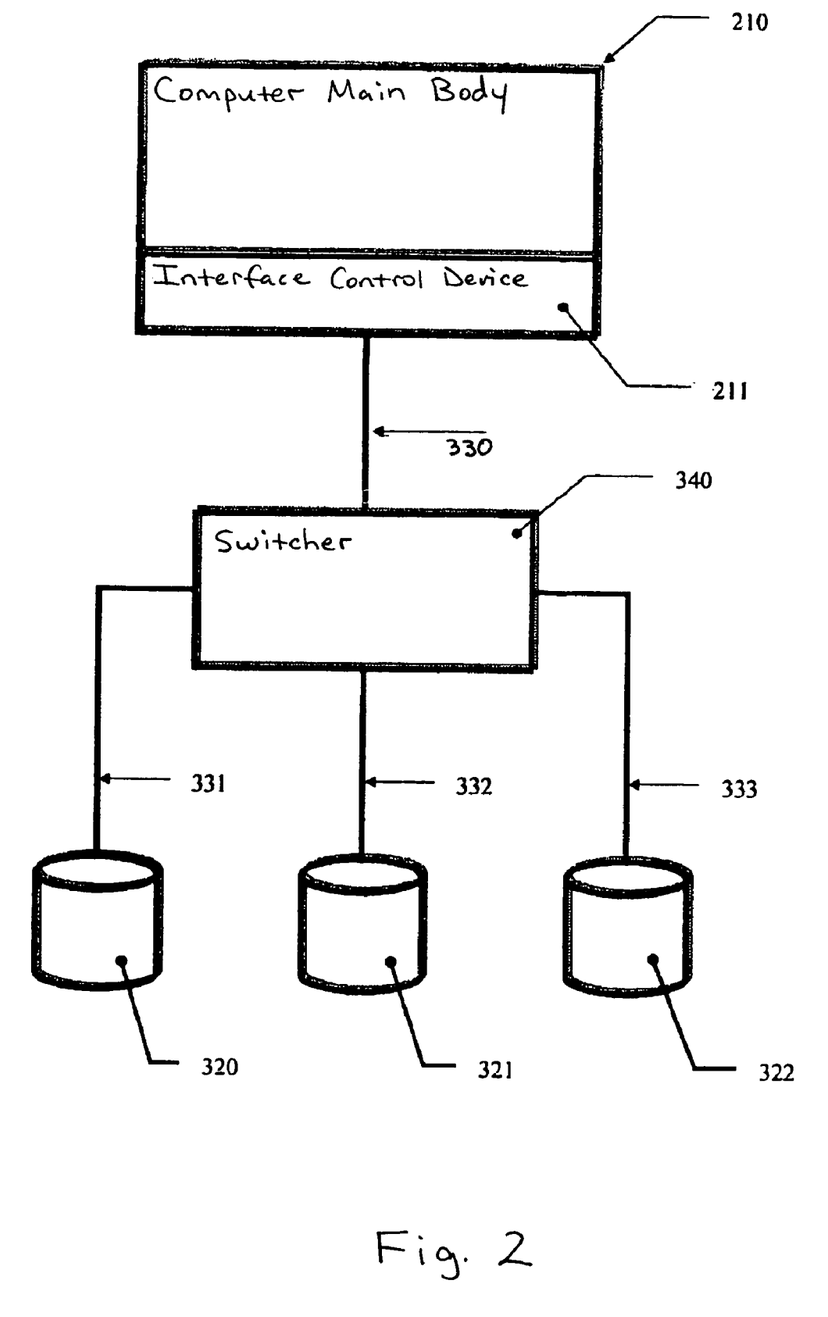
FIG. 2 is a diagram showing a computer system, according to another embodiment of the present invention.

FIG. 2 shows a block diagram of a computer system used in another embodiment of the present invention. The computer system in FIG. 2 differs from the computer system in FIG. 1 in that the interface control device 211 and the input/output devices 320 through 322 are connected via a switcher 340. In this embodiment of the present invention, the input/output devices 320 through 322 have single disks. However, the input/output devices may also be disk servers equipped with multiple physical disks, as in the configuration of FIG. 1.

An interface 330, which connects the interface control device 211 to the switcher 340, is capable of packet-type data transfer similar to the packet-type interface 230 shown in FIG. 1. There are no such transfer restrictions on the interfaces 331 through 333 that connect the switcher 340 to the input/output devices 320 through 322.

When data is transferred in packets from the input/output devices 320–322 to the switcher 340, the switcher 340 receives the packets through the interfaces 331 to 333, and then sends the packets to the interface control device 211, through the packet-type interface 330, in the order received from the input/output devices. On the other hand, the switcher 340 may partition the data received through the interfaces 331 to 333 into packets when packet-type data transfer is not carried out between the input/output devices 320–322 and the switcher 340, and then send the packets to the packet-type interface 330.

Figure 3:
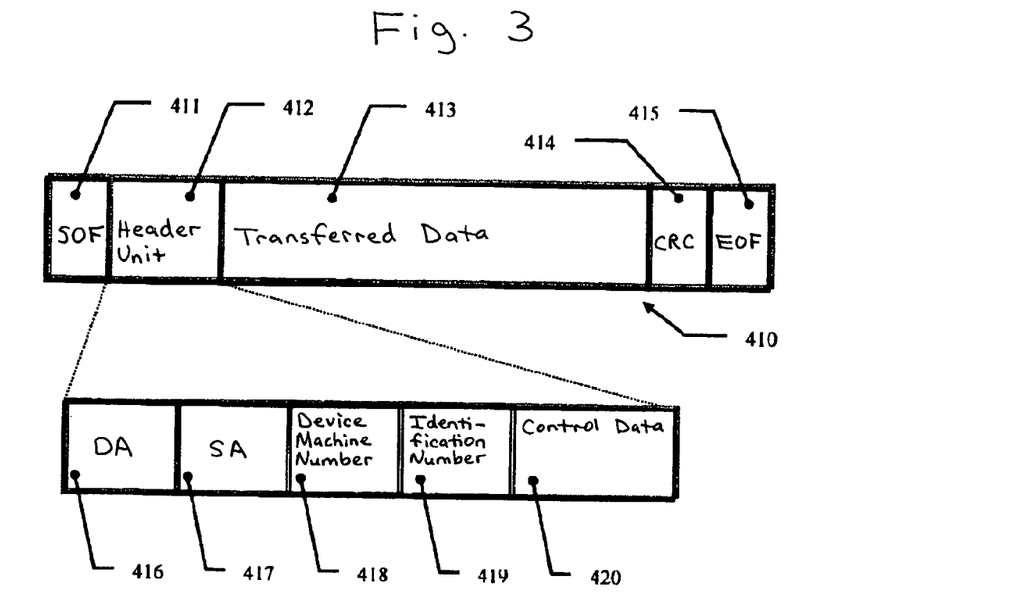
FIG. 3 is a diagram showing the format of a packet, according to the present invention.

FIG. 3 shows the packet format of the present invention. A single packet 410 is divided into a start of frame part 411, which indicates the beginning of the packet (hereinafter referred to as "SOF"); a header part 412, which indicates the characteristics and the attributes of the packet; a transferred data part 413; an error detection sign 414 (hereinafter referred to as "CRC"); and an end of frame part 415 (hereinafter referred to as "EOF"), which indicates the end of the packet.

The header part 412 is further divided into a destination part 416 (hereinafter referred to as "DA"), which indicates the address of the transmission destination device; a source port address part 417 (hereinafter referred to as "SA"), which indicates the address of the transmission source device; and a device machine number part 418, an identification number part 419, and a control data portion 420, which are used to carry out data transfer.

For each series of data sent by a particular input/output device, the identification number for the series of data is stored in the identification number portion 419 of the packets in the series of data. Also, a serial position number is stored in the control data 420. This "investment" number indicates the position of a packet in the multiple packets making up the particular data series.

The interface control device 211 refers to the SOF 411, CRC 414, and the EOF 415 to determine whether the configuration of the packet is normal. In addition, the interface control device 211 references the DA 416, which is stored in the header part 412, to determine the destination. The interface control device 211 can determine which input/output device is the data transmission source by referencing the SA 417 and the device machine number 418. The series of data to which the packet belongs can be determined by referencing the identification number 419, and the position of a packet in the series of data packets can be determined by referencing the control data 420.

Figure 5:
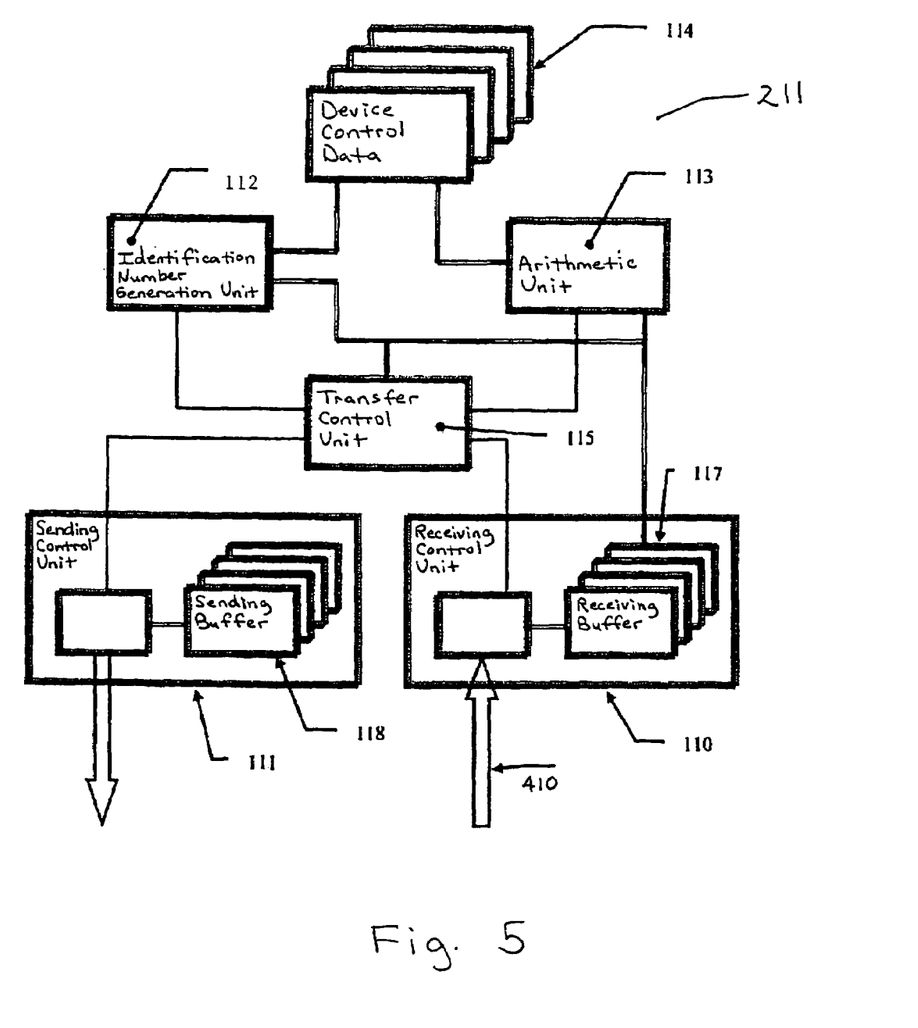
FIG. 5 is a diagram showing an interface control device, according to an embodiment of the present invention.

FIG. 5 shows a block diagram of the interface control device 211, according to one embodiment of the present invention. Referring to FIGS. 2 and 5, when an input/output device transfers a packet 410, through the switcher 340, to the interface control device 211, the packet 410 is received in a receiving control unit 110 in the interface control device 211. The receiving control unit 110 contains multiple receiving buffers 117. The packets transferred are stored in the receiving buffers 117 in the order received. Only a single packet may be stored in a single buffer.

A transfer control unit 115 is notified when a packet is received in the receiving control unit 110. The transfer control unit 115 then references the control data 420 of the packet stored in the receiving buffer 117 and determines the position of the packet in the series of data. When the packet received is the first or lead packet of the series of data, the transfer control unit 115 notifies an identification number generation unit 112 that new data transfer has started.

Because one input/output device may transfer more than one series of data, the transfer control unit 115 must be able to differentiate between each series of data transfers. As a result, the identification number that is coordinated with one data transfer series is not used in another data transfer series that begins before the ongoing data transfer is completed. Whether this identification number has been used in the past is irrelevant in its selection. An identification number may be reused for subsequent data transfers, as long as a data transfer that previously used the same number is completed. Therefore, the interface control device 211, by coordinating and monitoring each of the data transfers and the associated identification numbers, is able to avoid confusing the data transfers, even if multiple data transfers occur simultaneously.

Figure 4:
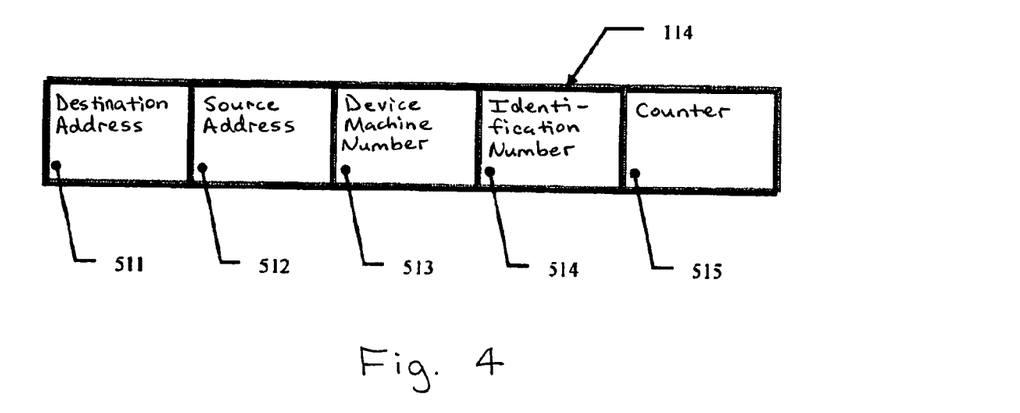
FIG. 4 is a diagram showing device control data, according to the present invention.

The identification number generation unit 112 creates new device control data 114 for each newly started data transfer series. The device control data 114, shown in FIG. 4, are used to verify the validity of the succeeding packets. The device control data 114 contains a destination address 511, which indicates the recipient of data; a source address 512; a device machine number 513; an identification number 514; and a counter 515.

The multiple packets in a particular series of packets must have the same transfer source and the same transfer address. Before partitioning the data into packets, the data can be viewed as a clump of data to be transferred to a single computer main body from a single input/output device. When the clump of data is partitioned into multiple packets, data with different transmission sources would not be mixed together in the middle of a data transfer. Therefore, the destination address 511, the source address 512, and the device machine number 513 remain constant in a series of packets.

The series of data to be transferred and the device control data 114 are coordinated using the identification number 419 in the packets. The identification numbers in the packets and in the device control data are compared to verify that no discrepancy occurs in this coordinating process.

The receiving side must restore the multiple packets received in the order in which they were partitioned. Therefore, a serial number is stored in the packet control data 420 to indicate the position of each packet in the series of packets. The data are transferred in sequence from beginning to end. As a result, the serial numbers that are stored in the control data 420 of the packets received are increased by one with the arrival of each new packet for the packets in a particular series of data. The counter 515, which is stored in the device control data 114, is used to verify the validity of the sequence of packets received. For a new series of data, the identification number generation unit 112 takes the value of the counter 515 as a beginning value and stores it when the device control data 114 are created. A 0 or 1 is usually used for the beginning value; however, in this embodiment of the present invention, a 1 is used.

Each of the packets in the series of data will have the same identification number 419. The device control data 114 must be specified uniformly from the identification number. As a result, the address in memory that is stored in the device control data 114 is determined by a conversion law using the identification number. In other words, because the device control data portion 114 contains 256 bytes (0×0100 in hexadecimal notation), the beginning address of the device control data is 0 and the beginning address of the succeeding device control data is 256 (0×0100 in hexadecimal notation).

The device control data corresponding to the identification number 0 starts from the address 0, and the device control data corresponding to the identification number 1 starts from the address 256 (0×0100 in hexadecimal notation). Coordination proceeds in this manner, with the beginning address of the device control data corresponding to identification number n determined by n×256 (n×0×0100 in hexadecimal notation).

Alternatively, there are no restrictions on having separate data that indicate the correspondence of the identification number and the device control data, taking into consideration the useful efficiency of the memory. In this case, the device control data are generated when a new packet is received and the corresponding data must be deleted when the series of data transfer is completed.

Returning to FIG. 5, when the interface control device 211 receives a leading packet from an input/output device, the identification number generation unit 112 stores a response packet, used to give notification to the input/output device, in the sending buffer 118 of the sending control unit 111. The notification contains the identification number selected for new data transfer. The identification number generation unit 112 notifies the transfer control unit 115 that it is ready to send the response. The transfer control unit 115 requests the sending control unit 111 to transmit, to the source of the new data transfer, the response packets prepared by the identification number generation unit 112 and stored in the sending buffer 118 of the sending control unit 111.

When a packet received by the interface control device 211 is not the lead packet in a series of data (i.e., the packet is the second or a succeeding packet), the transfer control unit 115 notifies an arithmetic unit 113 that the second or succeeding packets in the series have been received. The arithmetic unit 113 references the receiving buffer 117 in the receiving control unit 110 and confirms the identification number 419 stored in the packet received. The arithmetic unit 113 determines the device control data that correspond to the packet received using the identification number 419 as a key. As described above, the beginning address of the device control data corresponding to identification number n is n×256 (n×0×0100 in hexadecimal notation).

The arithmetic unit 113 compares the identification number 419 stored in the packet to the identification number 514 stored in the device control data 114 for purposes of confirmation. When these two numbers do not coincide, an internal conflict occurs inside the interface control device 211. In this case, the interface control device immediately interrupts the processing and shifts to error recovery mode.

When both identification numbers do coincide, the arithmetic unit 113 compares the DA 416, the SA 417, and the device machine number 418, which are stored in the packet, with the destination address 511, the source address 512, and the device machine number 513, which are stored in the device control data 114. If these two sets of numbers do not coincide, processing is terminated at this point and the transfer control unit 115 is notified. If the numbers do coincide, the data transmission source and the receiving address are correct, and operation is normal.

The arithmetic unit 113 compares the serial number, indicating packet position, in the control data 420 stored in the packet 410, with the counter value 515 stored in the device control data 114. The serial numbers stored in the packets change one by one in ascending order, starting with 1, as each packet is received. As a result, if the serial number stored in the packet has a value that is 1 greater than the counter value stored in the device control data 114, the situation is normal. Once the arithmetic unit 113 determines that the serial number stored in the packet is normal, it adds one to the counter value 515 of the device control data 114. The arithmetic unit 113 then notifies the transfer control unit 115 that the packet is normal.

The transfer control unit 115 continues to transfer the data when the contents of each packet are normal, based on the results determined by the arithmetic unit 113. The transfer control unit 115 carries out abnormal end processing for the data transfer when the contents of a packet are abnormal, notifies the data transfer source regarding the abnormal condition, and completes processing.

Figure 6:
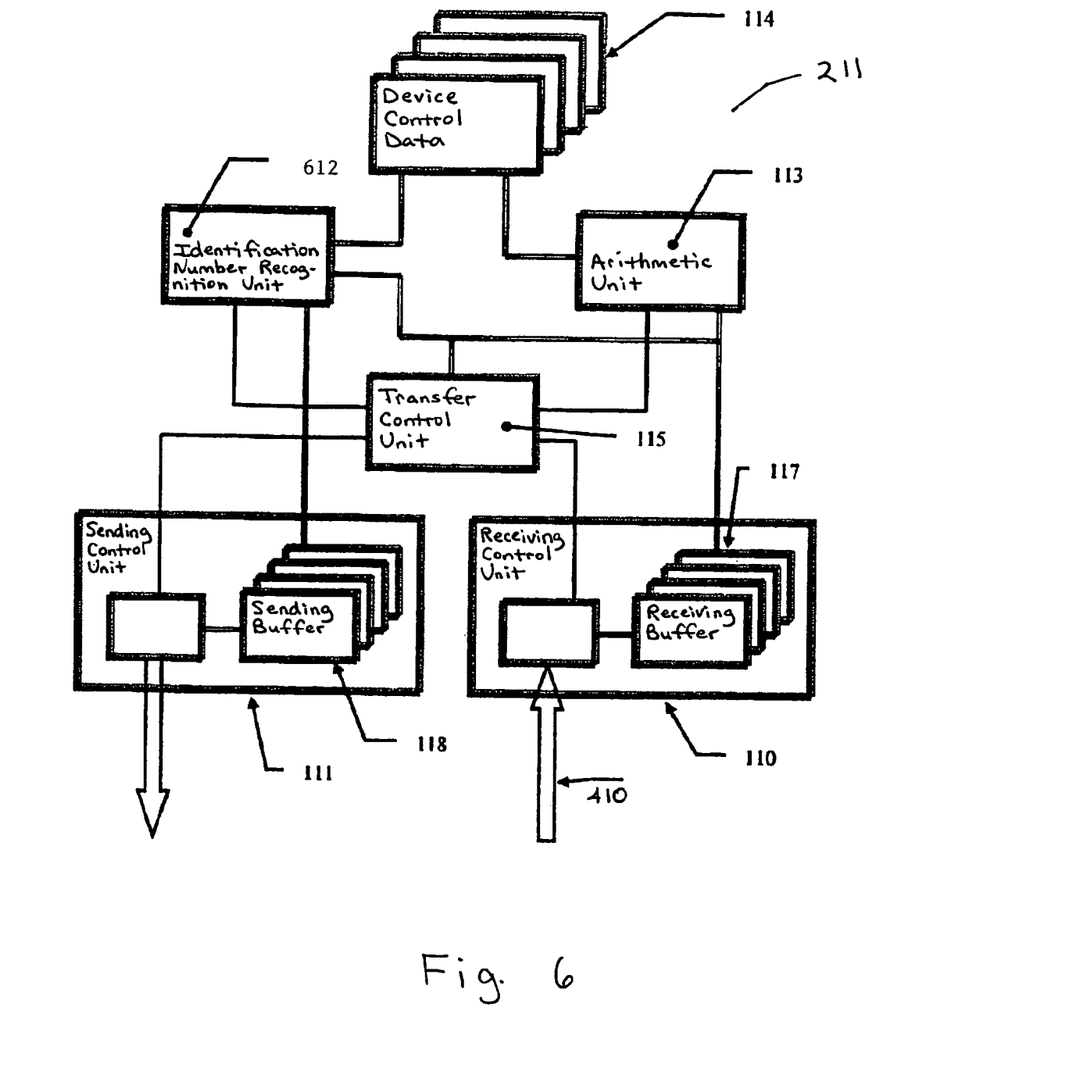
FIG. 6 is a diagram showing an interface control device, according to another embodiment of the present invention.

FIG. 6 shows a block diagram of the interface control device 211, according to another embodiment of the present invention. The embodiment in FIG. 6 differs from the embodiment in FIG. 5 in that the interface control device 211 in the embodiment of FIG. 6 includes an identification number recognition unit 612, rather than the identification number generation unit 112. In this embodiment of the present invention, the interface control device 211 does not select the identification number 419.

When a packet is received by the receiving control unit 110 and stored in any of the receiving buffers 117, the transfer control unit 115 is notified. The transfer control unit 115 references the control data 420 in the packet stored in the buffer 117 and determines whether the packet received is the lead packet in a series of data or whether it is the second or a succeeding packet.

When the packet received is the lead packet in a new series of data, the transfer control unit 115 notifies the identification number recognition unit 612 that new data transfer has begun. The identification number recognition unit 612 creates new device control data at this point to control the new data transfer. In this embodiment of the present invention, the identification number used to control the data transfer is assigned according to the data transfer source. The identification number 419, which is stored in the lead packet, is sent to the interface control device. The identification number recognition unit 612 must create the device control data 114 starting from the address corresponding to this identification number. The beginning address of the device control data, which is created to correspond to the identification number n, is determined as n×256 (n×0×0100 in hexadecimal notation). The contents of the device control data 114 created in this embodiment of the present invention are the same as the contents in the embodiment of the invention presented above.

Also, as in the previous embodiment, the data indicating correspondence between the identification number and the device control data may be retained separately, taking into consideration the usage efficiency of the memory.

The data transfer source already knows the identification number used in a series of data. As a result, the identification number need not be stored in the identification number portion 514 of the device control data to correspond with the packet received in the interface control device in this embodiment of the present invention.

Processing proceeds as in the previous embodiment of the present invention when the packet received is the second or a succeeding packet in the series of data.

The two previous embodiments of the present invention disclose an interface control device 211 with either an identification number generation unit 112 or an identification number recognition unit 612, respectively. Alternatively, the interface control device may contain both the identification number generation unit 112 and the identification number recognition unit 612, as illustrated in FIG. 7.

Figure 7:
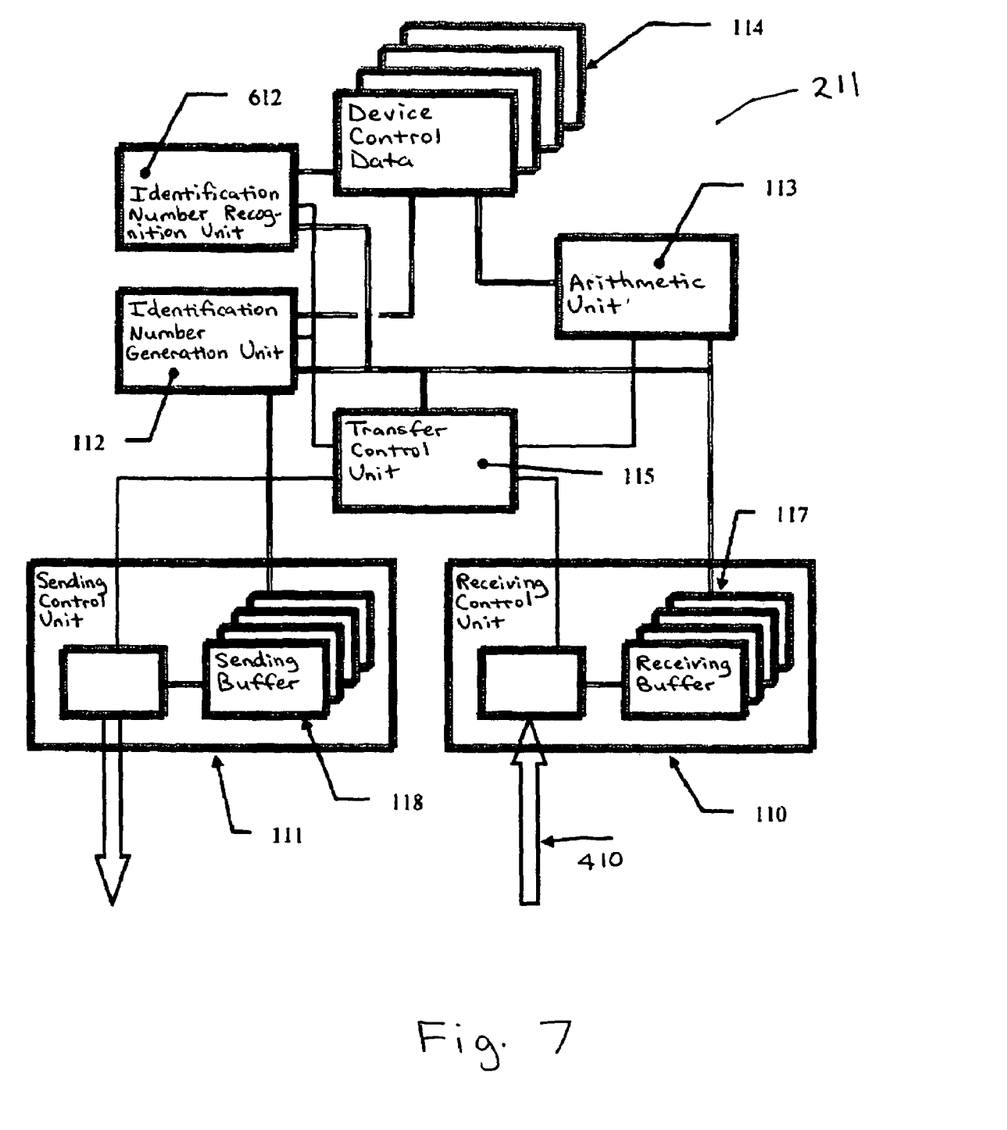
FIG. 7 is a diagram showing an interface control device, according to an additional embodiment of the present invention.

In the embodiment shown in FIG. 7, data must be stored in the control data 420 of the lead packet transferred to the interface control device indicating (1) whether the value stored in the packet as an identification number for controlling the data transfer is to be used, or (2) whether the interface control device must designate the identification number. This data is usually provided only in the lead packet.

The transfer control unit 115 references the control data 420 stored in the lead packet when the interface control device receives the lead packet to determine whether the interface control device 211 or the input/output device must designate the identification number. The transfer control unit 115 notifies the identification number generation unit 112 that the lead packet has been received if it is necessary for the interface control device 211 to designate the identification number. On the other hand, the transfer control unit 115 notifies the identification number recognition unit 612 that the lead packet has been received if the identification number is to be designated by the input/output device. Thereafter, the respective data transfers are continued according to the same procedures used in the previous embodiments of the present invention.

The computer system and the interface control device of the present invention are technologies that are extremely effective and highly reliable when used in large-capacity and high-speed computer systems that form the nucleus of information processing systems as the volume of data to be processed increases, as the use of input/output devices rapidly increases, and as network technologies are improved.

In addition, the present invention is suitable for use with optical fibers in data transfer paths. Compared with devices using electrical cables, optical fibers are expect to simplify the design operations of computer systems and contribute to a reduction in installation space.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An interface control device, comprising:
    a packet-type receiving control unit receiving data from one or more input/output devices, the data being transferred from the one or more input/output devices as one or more separate series of packets;
    a packet-type sending control unit sending the data to the input/output devices;
    an identification number generation unit creating new device control data to control the transfer of a particular series of packets from a sending one of the input/output devices, and determining an identification number only once for the particular series of packets when the receiving control unit receives a packet that is the first packet in the particular series of packets;
    a transfer control unit requesting the sending control unit to send a notification packet containing the identification number to the sending input/output device in response to receiving the first packet, the sending input/output device including the identification number in one or more succeeding packets sent after the first packet in the particular series of packets; and
    an arithmetic unit determining whether the data stored in each one of the succeeding packets received are normal by referencing the device control data corresponding to the identification number stored in each one of the succeeding packets, the transfer control unit continuing the transfer of data as long as the succeeding packets received are determined to be normal by the arithmetic unit, and causing an abnormal end to the data transfer when any one of the succeeding packets received is determined to be abnormal.

2. A computer system, comprising:
    at least one computer;
    a plurality of input/output devices transferring data to and from the at least one computer, each of the input/output devices transferring the data as a series of packets;
    new device control data controlling transfer of each series of packets, the new device control data being created when a receiving one of the at least one computer receives a beginning packet indicating the beginning of data transfer;
    an identification number corresponding to the control data, the identification number being provided only once to a sending one of the input/output devices sending the beginning packet, the sending input/output device storing the identification number in subsequent packets transferred; and
    a verification process determining, when the receiving computer receives one of the subsequent packets in the series of packets, whether the one of the subsequent packets is normal by referring to the control data and the corresponding identification number and ending data transfer if the data stored in the one of the subsequent packets is abnormal.

3. An interface control device for controlling the transfer of packets of data from one or more input/output devices, comprising:
    an identification number generation unit creating, when a packet received by the interface device is the lead packet in a series of packets from a sending one of the input/output devices, new device control data controlling the transfer of the series of packets, and determining a corresponding identification number only once for the series of packets; and
    a transfer control unit sending the identification number to the sending input/output device for inclusion in subsequent packets in the series of packets transferred; and
    a transmission interrupting process interrupting the transmission of the series of packets from the sending input/output device to allow transmission of packets from another one of the input/output devices.

4. A method of controlling the transfer of packets of data between a plurality of sending units and a receiving unit, comprising:
    creating, when a packet received is the lead packet in a series of packets sent from one of the sending units, new device control data to control the transfer of the series of packets, and determining a corresponding identification number only once for the series of packets;
    sending the identification number to the one of the sending units for inclusion in subsequent packets in the series of packets transferred; and
    interrupting the transmission of the series of packets from one of the sending units to allow transmission of packets from another one of the sending units.

5. A method of controlling the transfer of packets of data between one or more sending units and one or more receiving units, comprising:
    creating, when a packet received in one of the receiving units is a lead packet in a series of packets sent from one of the sending units, new device control data to control transfer of the series of packets, and determining a corresponding identification number only once for the series of packets;
    sending the identification number to the one of the sending units as a response to receiving the lead packet; and
    determining, when a subsequent packet in the series of packets is received, whether the data stored in the subsequent packet is normal by referring to the new device control data and to the identification number stored in the subsequent packet by the one of the sending units and ending the data transfer if the subsequent packet is determined to be abnormal.

6. A method of controlling the transfer of packets of data from a plurality of external devices to a computer, comprising:
    determining a lead packet in each series of packets and providing a different identification number only once for each series of packets to be transferred from each external device;
    storing each identification number in each packet of each corresponding series of packets to be transferred by each external device; and
    interrupting transfer of packets from one external device to allow transfer of packets from another external device.

7. The method of claim 6, further comprising determining whether the computer or each external device performs said providing a different identification number by referring to a control data portion stored in the lead packet in each series of packets received by the computer.

8. The method of claim 6, wherein said providing a different identification number is performed by the computer.

9. The method of claim 6, further comprising creating new device control data, controlling the transfer of each series of packets, and coordinating the beginning address of the control data with the identification number n according to the constant law n×256.

10. The method of claim 9, further comprising storing a serial position number in the new device control data indicating the position of each packet in each series of packets.

11. The method of claim 9, further comprising verifying the validity of packet received by comparing the data in a header portion of each packet to the new device control data using each corresponding identification number as a key, and terminating data transfer upon detection of an abnormal packet.

* * * * *